1. United States Patent
Zhang et al.

(10) Patent No.: US 8,649,123 B1
(45) Date of Patent: Feb. 11, 2014

(54) METHOD TO ELIMINATE REACTIVE ION ETCHING (RIE) LOADING EFFECTS FOR DAMASCENE PERPENDICULAR MAGNETIC RECORDING (PMR) FABRICATION

(75) Inventors: Jinqiu Zhang, Fremont, CA (US); Hai Sun, Milpitas, CA (US); Hongping Yuan, Fremont, CA (US); Tsung Yuan Chen, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1068 days.

(21) Appl. No.: 12/324,519

(22) Filed: Nov. 26, 2008

(51) Int. Cl.
*G11B 5/31* (2006.01)

(52) U.S. Cl.
USPC ................................. 360/125.03

(58) Field of Classification Search
None
See application file for complete search history.

(56) References Cited

U.S. PATENT DOCUMENTS

| | | | |
|---|---|---|---|
| 4,226,665 A | 10/1980 | Mogab | |
| 4,505,025 A | 3/1985 | Kurosawa et al. | |
| 4,538,343 A | 9/1985 | Pollack et al. | |
| 4,582,565 A | 4/1986 | Kawakatsu | |
| 4,584,761 A | 4/1986 | Wu | |
| 6,124,212 A | 9/2000 | Fan et al. | |
| 6,399,507 B1 | 6/2002 | Nallan et al. | |
| 7,313,863 B2 * | 1/2008 | Li et al. | 29/842 |
| 2005/0271951 A1 | 12/2005 | Kim | |
| 2006/0044677 A1 * | 3/2006 | Li et al. | 360/122 |
| 2007/0014048 A1 * | 1/2007 | Sasaki et al. | 360/126 |
| 2007/0279802 A1 | 12/2007 | Sasaki et al. | |
| 2008/0144215 A1 | 6/2008 | Hsiao et al. | |
| 2008/0316644 A1 * | 12/2008 | Lee et al. | 360/110 |
| 2010/0091407 A1 * | 4/2010 | Bonhote et al. | 360/235.4 |
| 2011/0051293 A1 * | 3/2011 | Bai et al. | 360/313 |
| 2012/0057257 A1 * | 3/2012 | Takano et al. | 360/125.12 |

OTHER PUBLICATIONS

Karttunen, et al., "Loading effects in deep silicon etching", Proceedings of International Society of Optical Engineering (SPIE) 2000, vol. 4174, pp. 90-97.

* cited by examiner

*Primary Examiner* — Kevin Bernatz

(57) ABSTRACT

A method for providing a perpendicular magnetic recording (PMR) head is disclosed. The method comprises: providing an insulating layer; covering the insulating layer with a hard mask material; forming a pre-defined shape in the hard mask material; forming a pole trench and a yoke area in the insulating layer by a first reactive ion etching (RIE) process in which the yoke area includes a loading prevention pattern; performing a wet etching process to remove the hard mask material from the pole trench and the yoke area; performing a second RIE process to remove the loading prevention pattern of the yoke area, wherein the pole trench and the remainder of the yoke area are not removed and remain having similar side wall angles; and providing a PMR pole in which at least a portion of the PMR pole resides in the pole trench.

16 Claims, 4 Drawing Sheets

METHOD TO ELIMINATE REACTIVE ION ETCHING (RIE) LOADING EFFECTS FOR DAMASCENE PERPENDICULAR MAGNETIC RECORDING (PMR) FABRICATION

BACKGROUND

A huge market exists for disk drives for mass-market computing devices such as desktop computers and laptop computers, as well as small form factor (SFF) disk drives for use in mobile computing devices (e.g. personal digital assistants (PDAs), cell-phones, digital cameras, etc.). To be competitive, a disk drive should be relatively inexpensive and provide substantial capacity, rapid access to data, and reliable performance.

One example of a disk drive is a hard disk drive. A conventional hard disk drive includes a rotating magnetic disk, write and read heads that are suspended by a suspension arm adjacent to a surface of the rotating magnetic disk, and an actuator that swings the suspension arm to place the read and write heads over selected circular tracks on the rotating disk. The read and write heads are directly located on a slider that has an air bearing surface (ABS). The suspension arm biases the slider towards the surface of the disk, and when the disk rotates, air adjacent to the disk moves along with the surface of the disk. The slider flies over the surface of the disk on a cushion of the moving air.

When the slider rides on the air bearing, the write and read heads are employed for writing magnetic transitions to and reading magnetic transitions from the rotating disk. The read and write heads are connected to processing circuitry that operates according to a program to implement writing and reading functions.

Perpendicular magnetic recording (PMR) transducers are now being utilized to increase the data density of hard disk drives. Such perpendicular magnetic recording transducers record magnetic bits of a data in a direction that is perpendicular to the surface of the magnetic disk. A write head is used that generally includes a write pole having a relatively small cross section at the air bearing surface (ABS) and a return pole having a larger cross section at the ABS. A magnetic write coil induces a magnetic flux to be emitted from the write pole in a direction generally perpendicular to the plane of the magnetic disk.

Thus, a conventional magnetic recording head may include a PMR transducer residing on the slider. As previously described, the slider also includes an air-bearing surface (ABS) that faces the disk. A conventional PMR transducer may include a PMR pole and a top shield separated by a write gap. The top shield may also act as a pole during writing. The conventional PMR pole may be surrounded by an insulating layer. Similarly, the top shield may also be surrounded by another insulating layer.

The conventional PMR pole may have sidewalls. In some applications, the height of the conventional PMR pole may be less than approximately three-tenths micrometer. The conventional PMR pole may also have a negative angle such that the top of the conventional PMR pole is wider than the bottom of the conventional PMR pole. Stated differently, the angle of the sidewalls may be less than 90 degrees. A pole having this height and shape is desirable for use in PMR applications.

However, in the case of conventional PMR pole fabrication, when a reactive ion etching (RIE) process is used in an insulating layer, an undesirable sidewall angle difference between the yoke and trench occurs due to an inevitable RIE loading effect caused by the different etching area between the trench area and the yoke area. Unfortunately, because of the sidewall angle difference between the yoke area and the trench area, the overall writing performance of the PMR pole of the write head is decreased.

Accordingly, there is a need for an improved PMR pole fabrication method in which the sidewalls of both the yoke area and trench area are formed having similar sidewall slopes.

DETAILED DESCRIPTION

In the following description, various embodiments of the invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, devices, procedures, components, electrical structures, circuits, etc., related to the fabrication of PMR transducers and PMR transducers themselves are not described in detail, or are shown in block diagram or reduced form, in order not to obscure the present invention.

Figure 1:
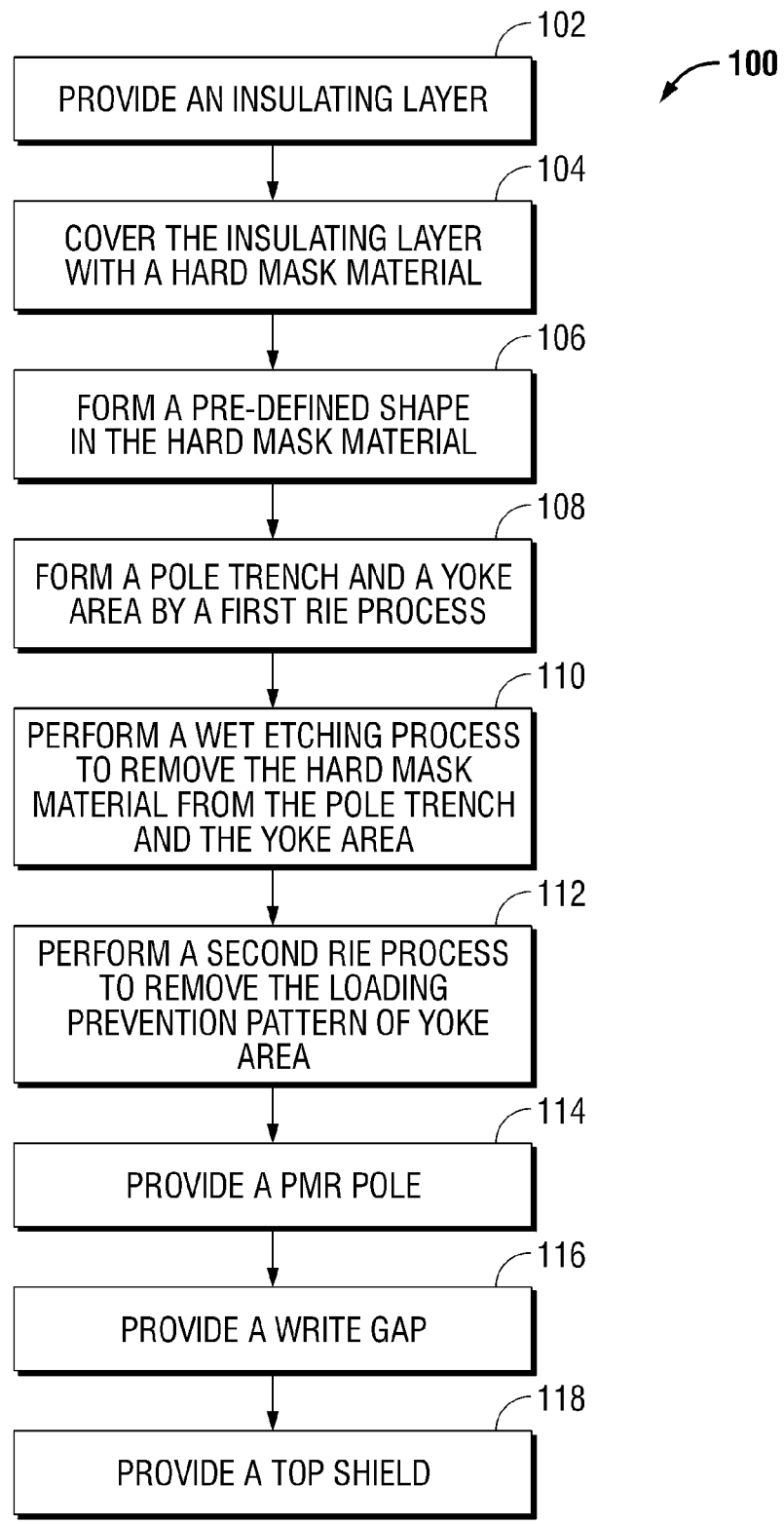
FIG. 1 is a flow chart illustrating a method to fabricate a PMR transducer, according to one embodiment of the invention.

FIG. 1 is a flow chart illustrating a method 100 to fabricate a PMR transducer, according to one embodiment of the invention. For simplicity, some steps may be omitted. The PMR transducer being fabricated may be part of a merged head that also includes a read head (not shown), along with other known elements, that reside on a slider (not shown). Method 100 may commence after the formation of a first pole and the formation of layers that will reside under a second pole. Method 100 is described in the context as providing a single PMR transducer. However, method 100 may be used to fabricate multiple transducers at substantially the same time.

To begin with, an insulating layer is provided (block 102). The insulating layer may be an alumina insulating layer, according to one embodiment. In one particular embodiment, the alumina insulating layer may be an $Al_2O_3$ insulating layer. The insulating layer may cover a stop layer. For example, the stop layer may be formed of Cr or NiCr or Ru material. Next, the alumina insulating layer may be covered with a hard mask material (block 104). For example, the hard mask material may be a NiFe material.

A pre-defined shape may then be formed in the hard mask material (block 106). After the pre-defined shape is formed, a pole trench and a yoke area may then be formed in the alumina insulating layer by a first reactive ion etching (RIE) process (block 108). The yoke area may include a loading prevention pattern.

Figure 2:
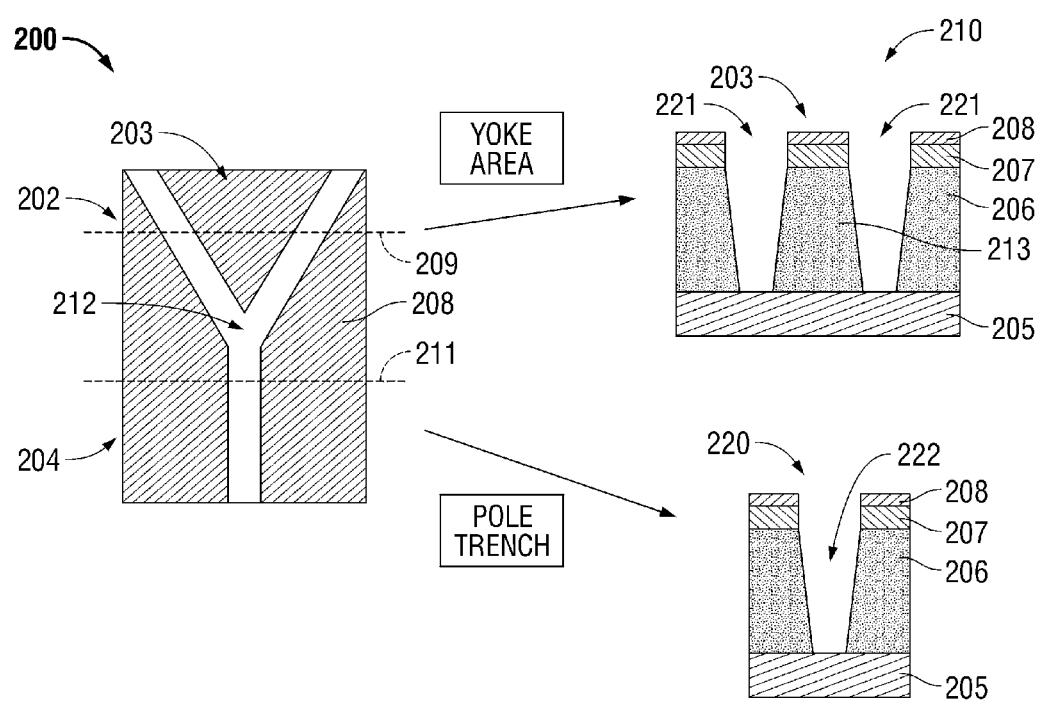
FIG. 2 is a diagram that illustrates a top view of the yoke area and the pole trench area and cross-sectional views of the yoke area and the pole trench area, according to one embodiment of the invention.

With reference now to FIG. 2, a diagram 200 is shown that illustrates a top view of the yoke area 202 and the pole trench area 204 and cross-sectional views of the yoke area and the pole trench area 210, 220, according to one embodiment of the invention. These cross-sectional yoke and pole trench areas are taken along lines 209 and 211.

It should be appreciated that the yoke area and the pole trench area are formed from a flat wafer. In particular, first a stop layer 205 is formed. The stop layer 205 may be formed of Cr or NiCr or Ru material. An alumina insulating layer 206 is formed over the stop layer 205. A Ta layer 207 may be formed over the alumina insulating layer 206. A hard mask material (e.g., NiFe) 208 may then be used to cover the Ta layer 207 and the alumina insulating layer 206.

In particular, as previously described, a pre-defined shape material may be formed in the hard mask material 208. In one embodiment, a lithography pattern may form a Y-shape pre-defined shape 212 in the hard mask material 208. Afterwards, the first RIE process is performed to form the pole trench 222 in the pole area 220 and a pair of trenches 221 in the yoke area 210 but the loading prevention pattern 203 and 213 remain. As can be seen in FIG. 2, both the pole trench and yoke trenches 222 and 221 have similar sidewall angles or slopes.

Thus, a first step of this process is to etch the pole trench 222 along with a portion of a yoke (e.g., yoke trenches 221) that is not covered by the loading prevention pattern 203, and as will be described, the second step is to etch out the loading prevention pattern 203 inside the yoke. As will be described, embodiments of the invention include a deposition, wet etching, and second RIE process scheme to remove the loading prevention pattern 203 as part of damascene PMR processing.

As shown in FIG. 1, in process 100, a wet etching process is performed to remove the hard mask material from the pole trench and the yoke area (block 110). Next, a second RIE process is performed to remove the loading prevention pattern of the yoke area (block 112). After this, a PMR pole may be provided (block 114) and a write gap may be provided (block 116). Further, a top shield may be provided (block 118).

Figure 3:
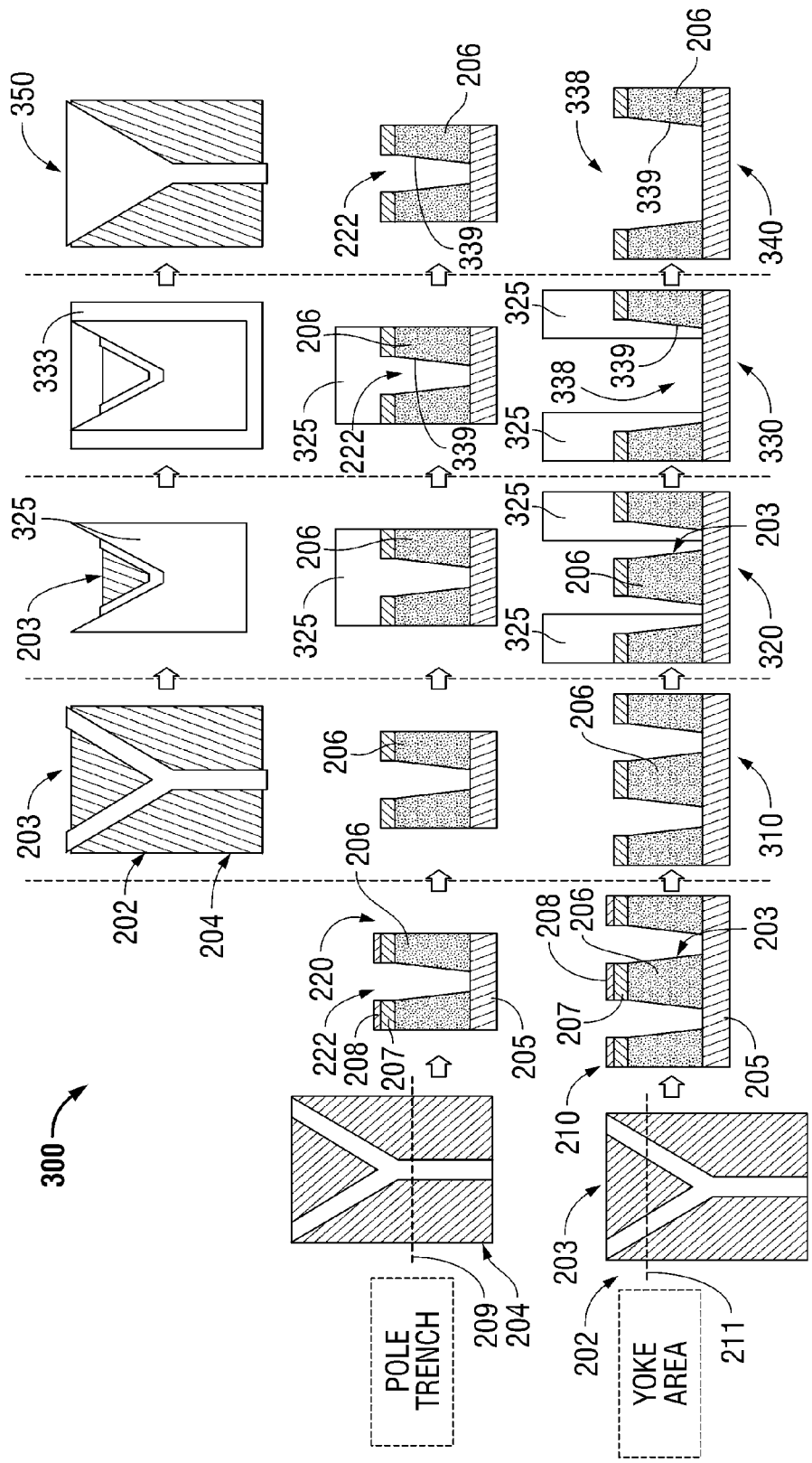
FIG. 3 is a diagram illustrating top views of the pole trench area and the yoke area and cross-sectional views of the pole trench and yoke area in order to illustrate steps to remove the loading prevention pattern from the yoke area, according to one embodiment of the invention.

Turning now to FIG. 3, FIG. 3 is a diagram 300 illustrating top views of the pole trench area 204 and the yoke area 202 and cross-sectional views of the pole trench and yoke area 220 and 210 in order to illustrate steps (310, 320, 330, and 340) to remove the loading prevention pattern 203 from the yoke area, according to one embodiment of the invention. At step 310, a wet etching process is performed to remove the hard mask material 208 from the pole trench area 220 and the yoke area 210. For example, the wet etch process may be utilized to remove the NiFe hard mask material.

Next, at step 320, a photo-resist process is performed to cover the pole trench area 220 and the yoke area 210, excluding the loading prevention pattern 203 of the yoke area 210, with photoresist material 325. Any suitable type of photoresist material may be utilized.

At step 330, a second RIE process 333 is performed to remove the loading prevention pattern 203 of the yoke area 210. It should be noted that the pole trench 220 and the remainder of the yoke area 210 are not removed due to the photoresist material 325 covering them. It should be further noted that the pole trench 222 and the remaining yoke area trench 338 remain with similar sidewall angles 339.

In one embodiment, the second RIE process to remove the loading prevention pattern 203 of the yoke area is an alumina RIE process, such as, an $Al_2O_3$ RIE process.

Lastly, at step 340, a lift off photoresist process may be performed to lift off the photoresist material.

Thus, the previously-described process 300 utilizes deposition, wet-etching and RIE processing to remove the loading prevention pattern 203 for damascene PMR processing. Accordingly, as previously described, in one embodiment, the first step includes the first $Al_2O_3$ RIE process which generates the pole trench and the yoke area trench having a loading prevention pattern inside the yoke trench, and the second step includes deposition, wet-etching and the second $Al_2O_3$ RIE process to remove the loading prevention pattern 203.

Embodiments of the invention therefore relate to a damascene process utilizing an alumina RIE process to generate a pole trench and a yoke area. A two-set patterning and etching process is used to prevent the RIE loading effect that generates an undesirable sidewall angle difference between the yoke areas and the pole trench areas. In particular, the previously described process removes the loading prevention pattern 203 inside the yoke area.

It has been found that by first utilizing NiFe as the hard mask material that the NiFe hard mask material can then be successfully removed by wet-etching. This wet-etching may then be followed by a second alumina RIE process to remove all the alumina inside the yoke area including the loading prevention pattern of the yoke area. Further, it should be noted that these patterning and etching processes are relatively simple and easy to implement and that these tools and materials are basic fabrication tools and materials.

Figure 4:
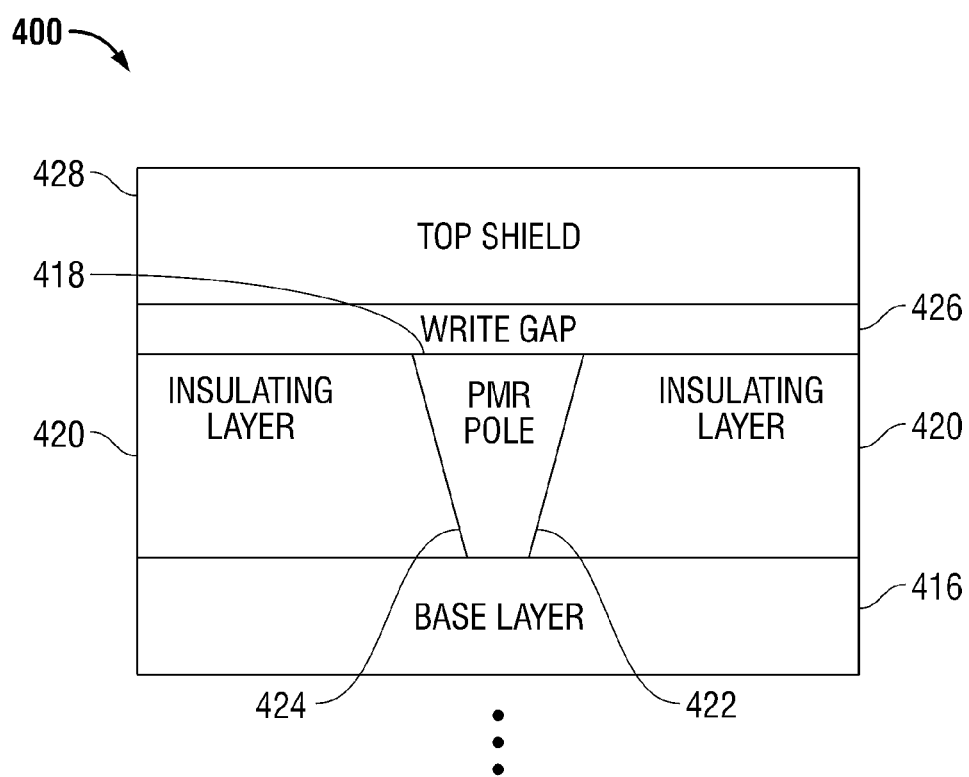
FIG. 4 illustrates a portion of a PMR transducer as viewed toward the air-bearing surface (ABS) that may be formed by the previously-described processes, according to one embodiment of the invention.

With reference now to FIG. 4, FIG. 4 illustrates a portion of a PMR transducer 400 as viewed toward the air-bearing surface (ABS) that may be formed by the previously-described processes. In particular, the PMR transducer 400 may include a base layer 416, an alumina insulating layer 420 having a PMR pole 418 formed with embodiments of the previously-described invention, a write gap 426, and a top shield 428.

In particular, PMR pole 418 may have sidewalls 422 and 424. These sidewalls 422 and 424 may be formed as part of the pole trench forming operations previously described. In particular, the sidewall angles of the pole trench area and the yoke area are formed, as previously described, such that they have similar sidewall angles or slopes which improve the overall performance of the PMR transducer, and in particular, create better writing performance.

Using the previously-described methods, PMR pole 418 may be provided using a damascene process. In particular, because the pole trench and yoke areas are formed having similar sidewall angles, the performance of the PMR transducer 400 is improved.

What is claimed is:

1. A perpendicular magnetic recording (PMR) head comprising:
   an insulating layer;
   a pole trench and a yoke area formed in the insulating layer, wherein the yoke area consists of a triangular shaped area having two side walls positioned on opposite sides of a centerline of the pole trench;
   wherein the pole trench and the two side walls of the yoke area comprise similar side wall angles; and
   a PMR pole, wherein at least a portion of the PMR pole is positioned within the pole trench,
   wherein the pole trench and the yoke area comprise a common bottom surface;

wherein the two side walls of the yoke area each terminate at the common bottom surface;
wherein the common bottom surface is substantially flat; and
wherein the portion of the PMR pole positioned within the pole trench is in direct contact with each of the side walls defining the pole trench.

2. The PMR head of claim 1, further comprising:
a write gap formed on the PMR pole; and
a top shield formed on the write gap.

3. The PMR head of claim 1, wherein the insulating layer comprises alumina.

4. The PMR head of claim 3, wherein the pole trench and the yoke area are formed in the insulating layer using an alumina RIE process to remove a loading prevention pattern of the yoke area.

5. The PMR head of claim 1, wherein the pole trench and the yoke area are farmed in the insulating layer using a hard mask material comprising NiFe.

6. The PMR head of claim 1, wherein the pole trench comprises a rectangular shape, and wherein a point of the triangular shaped area is positioned in an end of the rectangular shape.

7. The PMR head of claim 1, wherein the side wall angles of the pole trench and the side wall angles of the two side walls of the yoke area are equal.

8. The PMR head of claim 1, wherein the side walls of the pole trench and the side walls and the rear wall of the yoke area are each formed by the insulation layer.

9. The PMR head of claim 1:
wherein the insulating layer is initially covered with a hard mask material having a pre-defined shaped,
wherein the yoke area initially includes a loading prevention pattern,
wherein the pole trench and the yoke area are formed by performing:
a first reactive ion etching (RIE) process,
a wet etching process to remove the hard mask material from the pole trench and the yoke area, and
a second RIE process to remove the loading prevention pattern of the yoke area, wherein the pole trench and the remainder of the yoke area are not removed and comprise the similar side wall angles.

10. The PMR head of claim 9, wherein a photoresist process is performed to cover the pole trench and the yoke area, excluding the loading prevention pattern of the yoke area, with photoresist material such that when the second RIE process is performed only the loading prevention pattern of the yoke area is removed.

11. The PMR head of claim 9,
wherein the insulating layer comprises alumina, and
wherein the second RIE process to remove the loading prevention pattern of the yoke area comprises an alumina RIE process.

12. The PMR head of claim 9, wherein the hard mask material comprises NiFe.

13. The PMR head of claim 1, further comprising a stop layer providing the common bottom surface, wherein the insulating layer is positioned directly on the stop layer, and wherein the stop layer is comprised of a material selected from the group consisting of Cr, NiCr, and Ru.

14. The PMR head of claim 1, further comprising a layer of Ta positioned directly on the insulating layer without being positioned on the PMR pole.

15. The PMR head of claim 1, further comprising:
a stop layer forming the common bottom surface, wherein the insulating layer is positioned directly on the stop layer, and wherein the stop layer is comprised of a material selected from the group consisting of Cr, NiCr, and Ru; and
a layer of Ta positioned directly on the insulating layer without being positioned on the PMR pole.

16. A perpendicular magnetic recording (PMR) head comprising:
an insulating layer;
a pole trench and a yoke area formed in the insulating layer, wherein the yoke area is enclosed by a plurality of side walls, wherein the side walls of the pole trench and the side walls of the yoke area each comprise similar side wall angles; and
a PMR pole, wherein at least a portion of the PMR pole is positioned within the pole trench,
wherein the pole trench and the yoke area comprise a common bottom surface;
wherein the side walls of the yoke area each terminate at the common bottom surface;
wherein the common bottom surface is substantially flat; and
wherein the portion of the PMR pole positioned within the pole trench is in direct contact with each of the side walls defining the pole trench.

* * * * *